(12) United States Patent
Fujiwara

(10) Patent No.: US 12,259,751 B2
(45) Date of Patent: Mar. 25, 2025

(54) DISPLAY CONTROL DEVICE, DISPLAY DEVICE, AND NON-TRANSITORY COMPUTER READABLE MEDIUM

(71) Applicant: FUJIFILM Business Innovation Corp., Tokyo (JP)

(72) Inventor: Momoko Fujiwara, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/650,962

(22) Filed: Apr. 30, 2024

(65) Prior Publication Data

US 2024/0281028 A1      Aug. 22, 2024

Related U.S. Application Data

(63) Continuation of application No. 17/144,635, filed on Jan. 8, 2021, now Pat. No. 12,001,239.

(30) Foreign Application Priority Data

Aug. 25, 2020    (JP) .............................. 2020-141432

(51) Int. Cl.
    *G06F 1/16*      (2006.01)
(52) U.S. Cl.
    CPC ................. *G06F 1/1618* (2013.01)
(58) Field of Classification Search
    CPC ... G06F 3/04886; G06F 1/1618; G06F 1/1652
    See application file for complete search history.

(56) References Cited

U.S. PATENT DOCUMENTS

| | | | |
|---|---|---|---|
| 6,005,497 A | 12/1999 | Snyder | |
| 9,261,913 B2* | 2/2016 | Mittal | G06F 3/04886 |
| 9,600,078 B2* | 3/2017 | Rafii | G06T 15/20 |
| 10,402,065 B2* | 9/2019 | Kim | G06F 3/04812 |
| 10,824,268 B2* | 11/2020 | Nam Goong | G06F 3/0416 |
| 12,001,239 B2* | 6/2024 | Fujiwara | G06F 1/1652 |
| 2009/0213081 A1 | 8/2009 | Case, Jr. | |
| 2009/0237359 A1 | 9/2009 | Kim et al. | |
| 2009/0244832 A1 | 10/2009 | Behar et al. | |
| 2010/0323762 A1* | 12/2010 | Sindhu | G06F 1/1613 345/173 |
| 2013/0100026 A1* | 4/2013 | Vitsnudel | G06F 3/042 345/175 |
| 2013/0141854 A1 | 6/2013 | Behar et al. | |

FOREIGN PATENT DOCUMENTS

| | | |
|---|---|---|
| AT | 516094 A1 | 2/2016 |
| JP | 2017-130158 A | 7/2017 |
| WO | 2011056462 A1 | 5/2011 |

OTHER PUBLICATIONS

Sep. 27, 2023 Office Action issued in U.S. Appl. No. 17/144,635.
Jan. 31, 2024 Notice of Allowance issued in U.S. Appl. No. 17/144,635.

* cited by examiner

*Primary Examiner* — Adrian S Wilson
(74) *Attorney, Agent, or Firm* — Oliff PLC

(57) ABSTRACT

A display control device includes: a processor configured to: acquire a folding angle of a foldable display portion; and display a receiving portion configured to receive input by a user, on the display portion in different modes according to the folding angle.

6 Claims, 9 Drawing Sheets

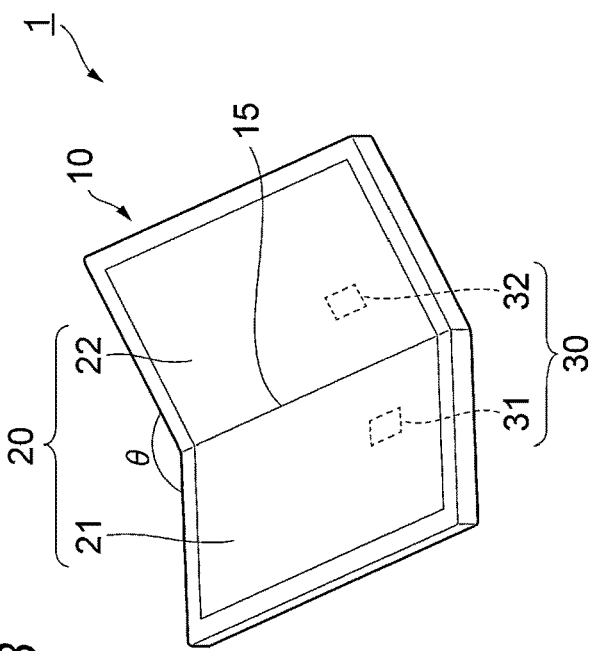
FIG.1A
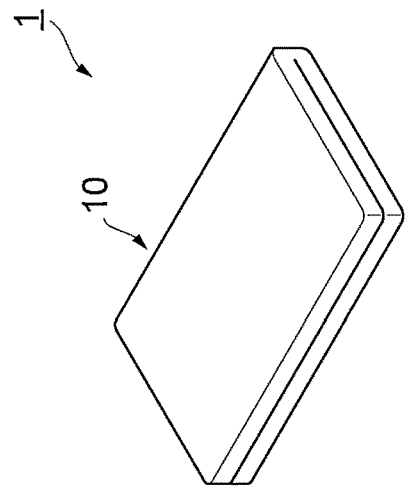
FIG.1B
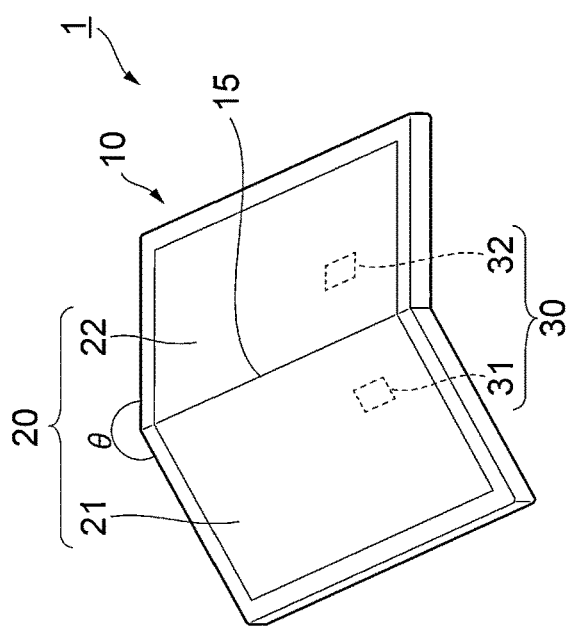
FIG.1C
FIG.1D

DISPLAY CONTROL DEVICE, DISPLAY DEVICE, AND NON-TRANSITORY COMPUTER READABLE MEDIUM

CROSS-REFERENCE TO RELATED APPLICATIONS

This application is a continuation of U.S. patent application Ser. No. 17/144,635, filed on Jan. 8, 2021, which claims benefit of priority under 35 USC 119 to Japanese Patent Application No. 2020-141432 filed Aug. 25, 2020. The contents of these applications are incorporated herein by reference in their entirety.

BACKGROUND

(i) Technical Field

The present disclosure relates to a display control device, a display device, and a non-transitory computer readable medium.

(ii) Related Art

As the related art, JP-A-2017-130158 discloses a technique in which, in an information processing apparatus having a foldable touch panel display portion, an input unit is displayed on a display region of the touch panel display portion when the touch panel display portion is folded.

SUMMARY

When a receiving portion that receives input by a user is displayed in the same mode on a display portion such as a foldable display irrespective of a folding angle of the display portion, the operability for the user to make an input to the receiving portion may be reduced depending on the folding angle of the display portion.

Aspects of non-limiting embodiments of the present disclosure relate to preventing the operability for a user to make an input to a receiving portion from being reduced, as compared with a case where the receiving portion is displayed in the same mode on a foldable display portion irrespective of a folding angle of the display portion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display control device including: a processor configured to: acquire a folding angle of a foldable display portion; and display a receiving portion configured to receive input by a user, on the display portion in different modes according to the folding angle.

BRIEF DESCRIPTION OF THE DRAWINGS

Exemplary embodiment(s) of the present disclosure will be described in detail based on the following figures, wherein:

FIGS. 1A to 1D are perspective views illustrating an example of an information processing apparatus to which an exemplary embodiment is applied;

DETAILED DESCRIPTION

Hereinafter, exemplary embodiments of the present disclosure will be described with reference to the accompanying drawings.

First Exemplary Embodiment

Figure 2:
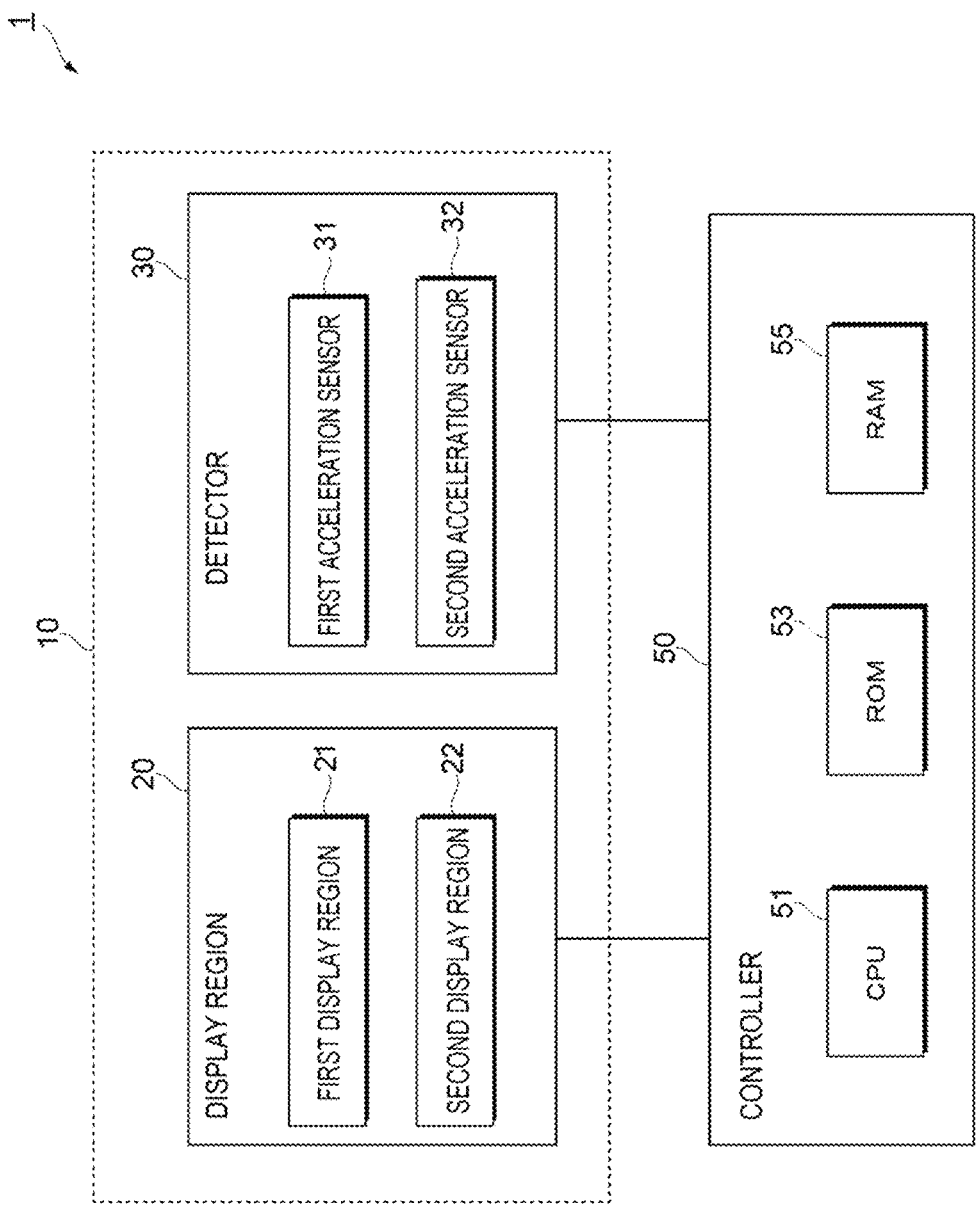
FIG. 2 is a view illustrating an example of a hardware configuration of the information processing apparatus to which the exemplary embodiment is applied.

FIGS. 1A to 1D are perspective views illustrating an example of an information processing apparatus 1 to which a first exemplary embodiment is applied. FIG. 1A is a view illustrating a state in which the information processing apparatus 1 is unfolded (a state in which a folding angle θ to be described later is 180°). Further, FIG. 1B is a view illustrating a state in which the information processing apparatus 1 is folded (a state in which the folding angle θ is 120°). Further, FIG. 1C is a view illustrating a state in which the information processing apparatus 1 is folded (a state in which the folding angle θ is 240°). Furthermore, FIG. 1D is a view illustrating a state in which the information processing apparatus 1 is closed (a state in which the folding angle θ is 0°). FIG. 2 is a view illustrating an example of a hardware configuration of the information processing apparatus 1 to which the present exemplary embodiment is applied.

The information processing apparatus 1 of the present exemplary embodiment is an apparatus including a display portion that displays an image, for example, a tablet terminal, a smartphone, a PDA (Personal Digital Assistant), a game device, a PC (Personal Computer), or the like.

The information processing apparatus 1 of the present exemplary embodiment includes a foldable display portion 10 having a display region 20 that displays an image, a detector 30 that detects a folding angle θ of the display portion 10, and a controller 50 serving as an example of an display control device or a display controller that controls display in the display region 20 of the display portion 10 based on the result of detection by the detector 30.

The display portion 10 of the present exemplary embodiment has a rectangular plate shape having a major axis direction (long axis direction) and a minor axis direction (short axis direction), and the display region 20 is provided on one surface thereof. The display portion 10 displays an image on the display region 20 based on control by the controller 50 and receives an operation by a user for the display region 20. The display portion 10 is not particularly limited as long as it has a function of displaying an image and a function of receiving an operation by a user. For example, a liquid crystal display, an organic EL display, or the like provided with a touch panel may be used for the display portion 10.

As illustrated in FIGS. 1B and 1C, the display portion 10 may be folded along a folding portion 15 extending along the minor axis direction. Although not particularly limited, the configuration for making the display portion 10 foldable may employ, for example, an elastic material that may be deformed by a physical force, one or more hinges, and the like.

The display region 20 is composed of a first display region 21 and a second display region 22 arranged in the major axis direction with the folding portion 15 interposed therebetween.

In the present exemplary embodiment, the folding portion 15 is provided at the center of the display portion 10 in the major axis direction. As a result, the areas of the first display region 21 and the second display region 22 are equal to each other.

The position of the folding portion 15 is not limited to the center of the display portion 10 in the major axis direction, and may be a position where the areas of the first display region 21 and the second display region 22 are different from each other. Further, the folding portion 15 may extend along the major axis direction of the display portion 10.

The detector 30 detects the acceleration of the display portion 10. As illustrated in FIGS. 1A to 1C and FIG. 2, the detector 30 includes a first acceleration sensor 31 that detects the acceleration in the first display region 21 of the display portion 10 and a second acceleration sensor 32 that detects the acceleration in the second display region 22 of the display portion 10.

The first acceleration sensor 31 detects the acceleration of the display portion 10 in the major axis direction, the acceleration of the display portion 10 in the minor axis direction, and the acceleration in a direction perpendicular to the first display region 21 (that is, a direction perpendicular to the major axis direction and the minor axis direction), as the acceleration of the first display region 21. Similarly, the second acceleration sensor 32 detects the acceleration of the display portion 10 in the major axis direction, the acceleration of the display portion 10 in the minor axis direction, and the acceleration in a direction perpendicular to the second display region 22 (that is, a direction perpendicular to the major axis direction and the minor axis direction), as the acceleration of the second display region 22.

The first acceleration sensor 31 and the second acceleration sensor 32 detects the accelerations of the first display region 21 and the second display region 22 continuously or periodically at a predetermined timing while the information processing apparatus 1 is activated.

Then, the detector 30 outputs the acceleration of the first display region 21 detected by the first acceleration sensor 31 and the acceleration of the second display region 22 detected by the second acceleration sensor 32 to the controller 50.

Although the details will be described later, the controller 50 acquires the folding angle θ of the display portion 10 and the orientation of the display portion 10 from the acceleration of the first display region 21 and the acceleration of the second display region 22 output from the detector 30.

Here, the folding angle θ of the display portion 10 refers to an angle formed by the first display region 21 and the second display region 22 in the display portion 10, as illustrated in FIGS. 1A to 1C.

In the information processing apparatus 1 of the present exemplary embodiment, the display portion 10 is configured to be foldable so that the folding angle θ is in a range of 0° or more and less than 360°. For example, when the folding angle θ is 0°, as illustrated in FIG. 1D, the display portion 10 is in a closed state, and the first display region 21 (see FIG. 1A) and the second display region 22 (see FIG. 1A) are in a facing state. When the folding angle θ is 180°, as illustrated in FIG. 1A, the first display region 21 and the second display region 22 are oriented in the same direction so that the first display region 21 and the second display region 22 are in a flat state.

Further, the orientation of the display portion 10 refers to the orientation of the display portion 10 with respect to the orientation of the image displayed on the display region 20. In the information processing apparatus 1 of the present exemplary embodiment, according to, for example, the usage state of the information processing apparatus 1 by the user, the orientation of the display portion 10 is switched between a first orientation (see FIGS. 4 to 6B to be described later) in which the vertical direction of the image displayed in the display region 20 extends along the minor axis direction of the display portion 10, and a second orientation (see FIGS. 7 and 8 to be described later) in which the vertical direction of the image displayed in the display region 20 extends along the major axis direction of the display portion 10.

When the orientation of the display portion 10 is the first orientation, the display portion 10 displays the image on the display region 20 with the first display region 21 and the second display region 22 arranged from side to side. When the orientation of the display portion 10 is the second orientation, the display portion 10 displays the image on the display region 20 with the first display region 21 and the second display region 22 arranged one above the other.

The detector 30 of the present exemplary embodiment uses the first acceleration sensor 31 and the second acceleration sensor 32 that detect the acceleration of the display region 20. It is noted that the present disclosure is not limited thereto. When the controller 50 may acquire the folding angle θ of the display portion 10 and the orientation of the display portion 10 based on the detection result by the detector 30, an angular velocity sensor, a geomagnetic sensor, or the like may be used as the detector 30. Plural types of sensors may be used in combination for the detector 30.

As illustrated in FIG. 2, the controller 50 includes a CPU (Central Processing Unit) 51, a ROM (Read Only Memory) 53, and a RAM (Random Access Memory) 55.

The CPU 51, which is an example of a processor, implements each function to be described later by loading and executing various programs stored in the ROM 53 into the RAM 55. The RAM 55 is a memory used as a working memory of the CPU 51. The ROM 53 is a memory that stores various programs and the like executed by the CPU 51.

The controller 50 acquires the acceleration of the first display region 21 and the acceleration of the second display region 22 output from the detector 30. Then, the controller 50 acquires the folding angle θ of the display portion 10 and the orientation of the display portion 10 from the acceleration of the first display region 21 and the acceleration of the second display region 22.

Further, the controller 50 controls the display on the display region 20 of the display portion 10. Although the details will be described later, the controller 50 displays a receiving portion 70 (see FIG. 4 to be described later) that receives an operation by a user, on the display region 20 based on the folding angle θ of the display portion 10 and the orientation of the display portion 10.

The receiving portion 70 is an image displayed in the display region 20 for receiving an input of characters by an operation such as touching with a user's fingertip or a touch pen. Examples of the receiving portion 70 may include a software keyboard displayed on the display region 20, various buttons displayed on the display region 20, and the like. In the description of the present exemplary embodiment, the characters are symbols used when creating words, sentences, mathematical expressions, etc., and include symbols, pictograms, stamps, and the like in addition to the characters input by the operation of the receiving portion 70.

In the information processing apparatus 1 having the foldable display portion 10, when the receiving portion 70 is displayed on the display region 20 in the same mode irrespective of the folding angle θ of the display portion 10, the operability for the user to make an input to the receiving portion 70 may be reduced depending on the folding angle θ of the display portion 10.

In contrast, in the information processing apparatus 1 of the present exemplary embodiment, the controller 50 acquires the folding angle θ of the display portion 10 from the detection result by the detector 30. Then, the controller 50 displays the receiving portion 70 on the display region 20 in different modes according to the folding angle θ of the display portion 10. As a result, in the information processing apparatus 1 of the present exemplary embodiment, the operability for the user to make an input to the receiving portion 70 is prevented from being reduced as compared with the case where the receiving portion 70 is displayed on the display region 20 in the same mode irrespective of the folding angle θ of the display portion 10.

Hereinafter, the mode of the receiving portion 70 displayed on the display region 20 of the display portion 10 based on a process performed by the controller 50 and a control by the controller 50 will be described in detail.

Figure 3:
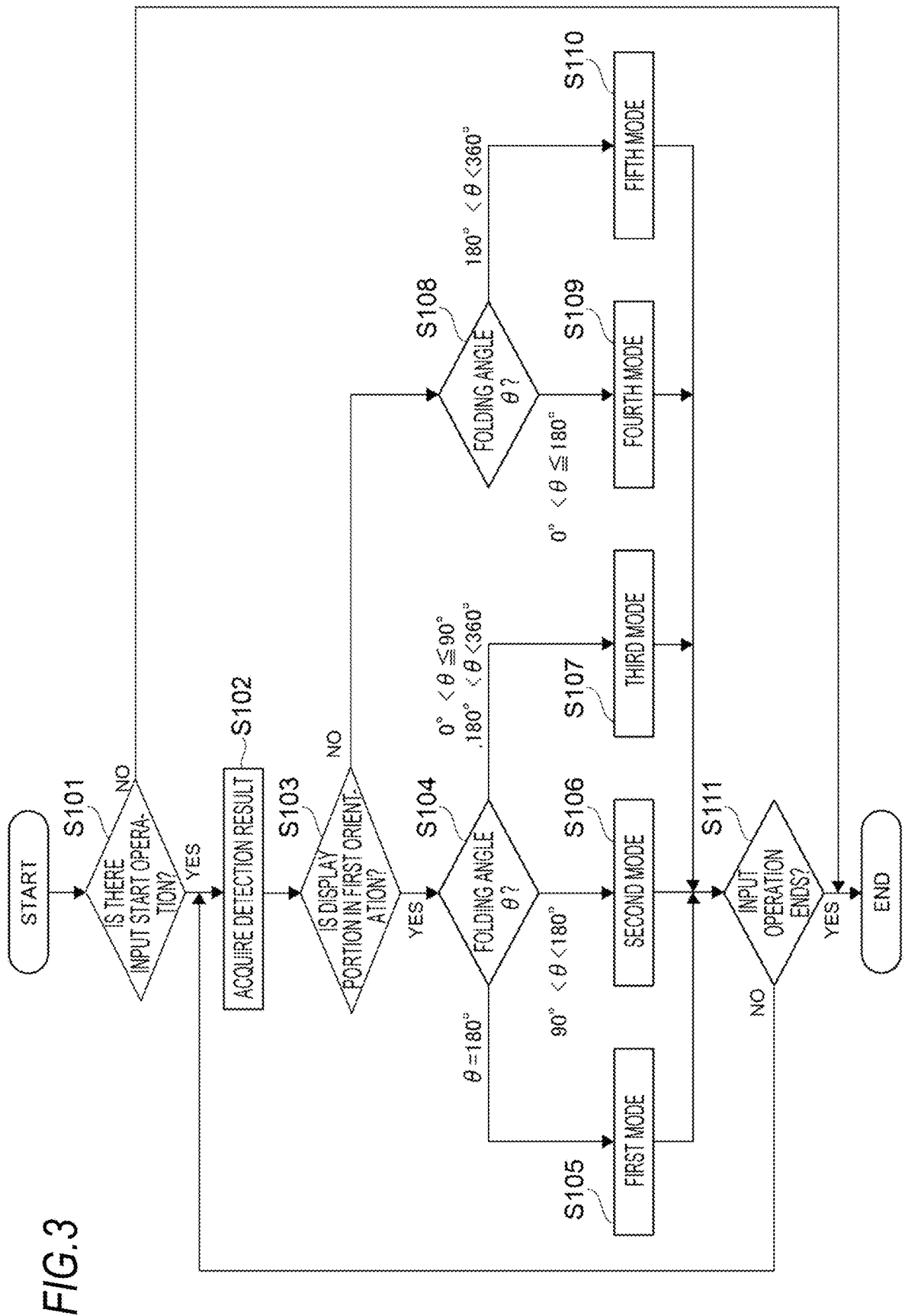
FIG. 3 is a flowchart of a process executed by a controller of the exemplary embodiment.

FIG. 3 is a flowchart of a process executed by the controller 50 of the present exemplary embodiment.

When the information processing apparatus 1 is powered on and started, the detector 30 starts detecting the accelerations of the first display region 21 and the second display region 22. Further, the controller 50 displays an image of a predetermined home screen or the like on the display region 20 of the display portion 10, and starts monitoring the presence or absence of user's operation input to the display region 20. In the information processing apparatus 1, when the display portion 10 is in a closed state (that is, when the folding angle θ of the display portion 10 is 0°), an image is not displayed on the display region 20. Therefore, the following process is performed when the display portion 10 is an unfolded state, that is, when the folding angle of the display portion 10 is larger than 0°.

First, the controller 50 determines whether a predetermined operation has been performed by the user for the display portion 10. In this example, the controller 50 determines whether a predetermined input start operation has been performed by the user for the image displayed on the display region 20 of the display portion 10, as the predetermined operation for the display portion 10 (step 101).

Here, the input start operation is an operation that requires an input of characters using the receiving portion 70. Examples of the input start operation may include an operation of selecting an input field for characters displayed on the display region 20 (for example, an input field of a search engine, a message input field, or a personal information input field). Further, the input start operation may include an operation of starting an application that requires an input of characters (for example, a memo pad application, an e-mail application, or an SNS (Social Networking Service) application). Further, the input start operation may include an operation of transitioning the image displayed on the display region 20 to an image for which an input of characters is required (for example, a password input screen).

When it is determined that the input start operation is not performed for the image displayed on the display region 20 ("NO" in step 101), the controller 50 ends a series of processes.

Meanwhile, when it is determined that the input start operation is performed for the image displayed on the display region 20 ("YES" in step 101), the controller 50 acquires the detection result output from the detector 30 (step 102). More specifically, the controller 50 acquire the acceleration of the first display region 21 detected by the first acceleration sensor 31 and the acceleration of the second display region 22 detected by the second acceleration sensor 32, as the detection result output from the detector 30.

Then, the controller 50 acquires the folding angle θ of the display portion 10 and the orientation of the display portion 10 from the acquired acceleration of the first display region 21 and the acquired acceleration of the second display region 22.

Next, the controller 50 determines whether the orientation of the display portion 10 acquired in step 102 is the first orientation (step 103). In the present exemplary embodiment, as described above, the first orientation is the orientation in which the first display region 21 and the second display region 22 are arranged from side to side. The second orientation is the orientation in which the first display region 21 and the second display region 22 are arranged one above the other.

When it is determined that the orientation of the display portion 10 is the first orientation ("YES" in step 103), the controller 50 determines whether the folding angle θ of the display portion 10 is 180° (θ=180°), larger than 90° and smaller than 180° (90°<θ<180°), larger than 0° and equal to or smaller than 90°, or larger than 180° and smaller than 360° (0°<θ≤90°, 180°<θ<360°).

When it is determined that the folding angle θ of the display portion 10 is 180° (θ=180° in step 104), the controller 50 displays the receiving portion 70 on the display region 20 of the display portion 10 in a predetermined first mode (step 105).

Figure 4:
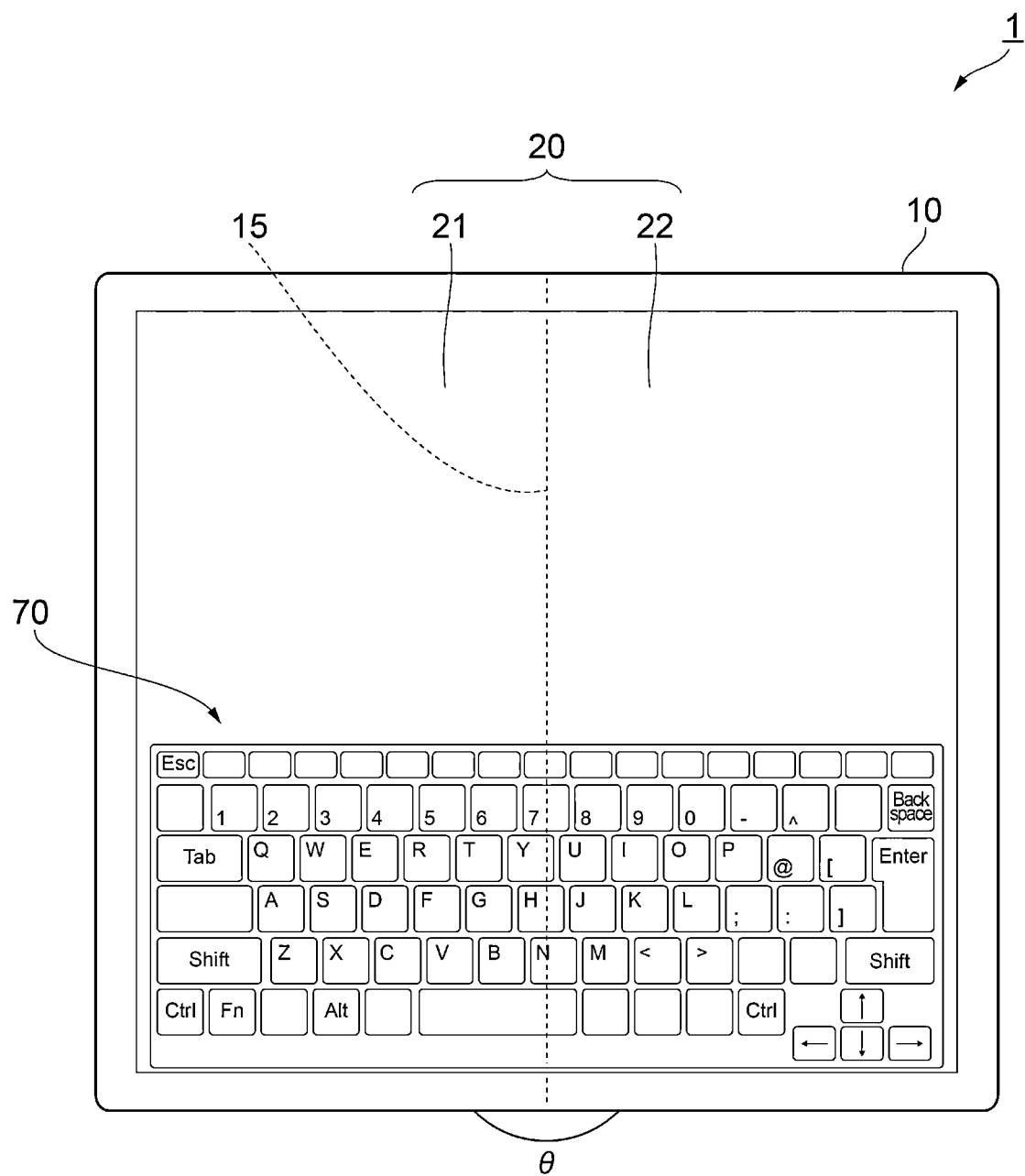
FIG. 4 is a view illustrating a receiving portion of a first mode displayed on a display region.

FIG. 4 is a view illustrating the receiving portion 70 of the first mode displayed on the display region 20. In FIG. 4, the vertical direction of the figure corresponds to the vertical direction of an image displayed on the display region 20 of the display portion 10.

As illustrated in FIG. 4, the receiving portion 70 of the first mode is displayed across the first display region 21 and the second display region 22 of the display region 20. Further, in the receiving portion 70 of the first mode, the area where the receiving portion 70 is displayed on the display region 20 (hereinafter, referred to as the display area of the receiving portion 70) is about 45% of the display region 20. Further, in this example, the receiving portion 70 of the first mode has the same key layout as a physical keyboard used in a PC (Personal Computer).

Here, when the folding angle θ of the display portion 10 is 180°, in many cases, the user operates the display region 20 with both hands while putting the information processing apparatus 1 on a table or the like, or grasps the information processing apparatus 1 with one hand and, at the same time, operates the display region 20 with the other hand. When the folding angle θ of the display portion 10 is 180°, since the first display region 21 and the second display region 22 are flat, the manipulation of the user on the display region 20 is hard to be hindered even around the folding portion 15.

Therefore, in the information processing apparatus 1 of the present exemplary embodiment, when the folding angle θ of the display portion 10 is 180°, by displaying the receiving portion 70 across the first display region 21 and the second display region 22 in the first mode illustrated in FIG. 4, the operability for the user to make an input to the receiving portion 70 is improved.

Referring back to FIG. 3, when it is determined that the folding angle θ of the display portion 10 is larger than 90° and smaller than 180° (90°<θ<180° in step 104), the controller 50 displays the receiving portion 70 on the display region 20 of the display portion 10 in a second mode different from the first mode described above (step 106).

Here, the "different mode" of the receiving portion 70 refers to a mode with different operability when the user operates the receiving portion 70. The operability is defined as how easily the receiving portion 70 is operated that is determined based on how easily the user's fingers or touch pen reach the receiving portion 70, and how easily the user's fingers or touch pen touch elements constituting the receiving portion 70. Specifically, the mode with different operability may be a mode different in at least one of (i) the display position of the receiving portion 70 on the display region 20 of the display portion 10, (ii) the display area of the receiving portion 70 on the display region 20 of the display portion 10, or (iii) the elements constituting the receiving portion 70. Examples of the elements constituting the receiving portion 70 may include the type, layout, and number of the key constituting the receiving portion 70.

Figure 5:
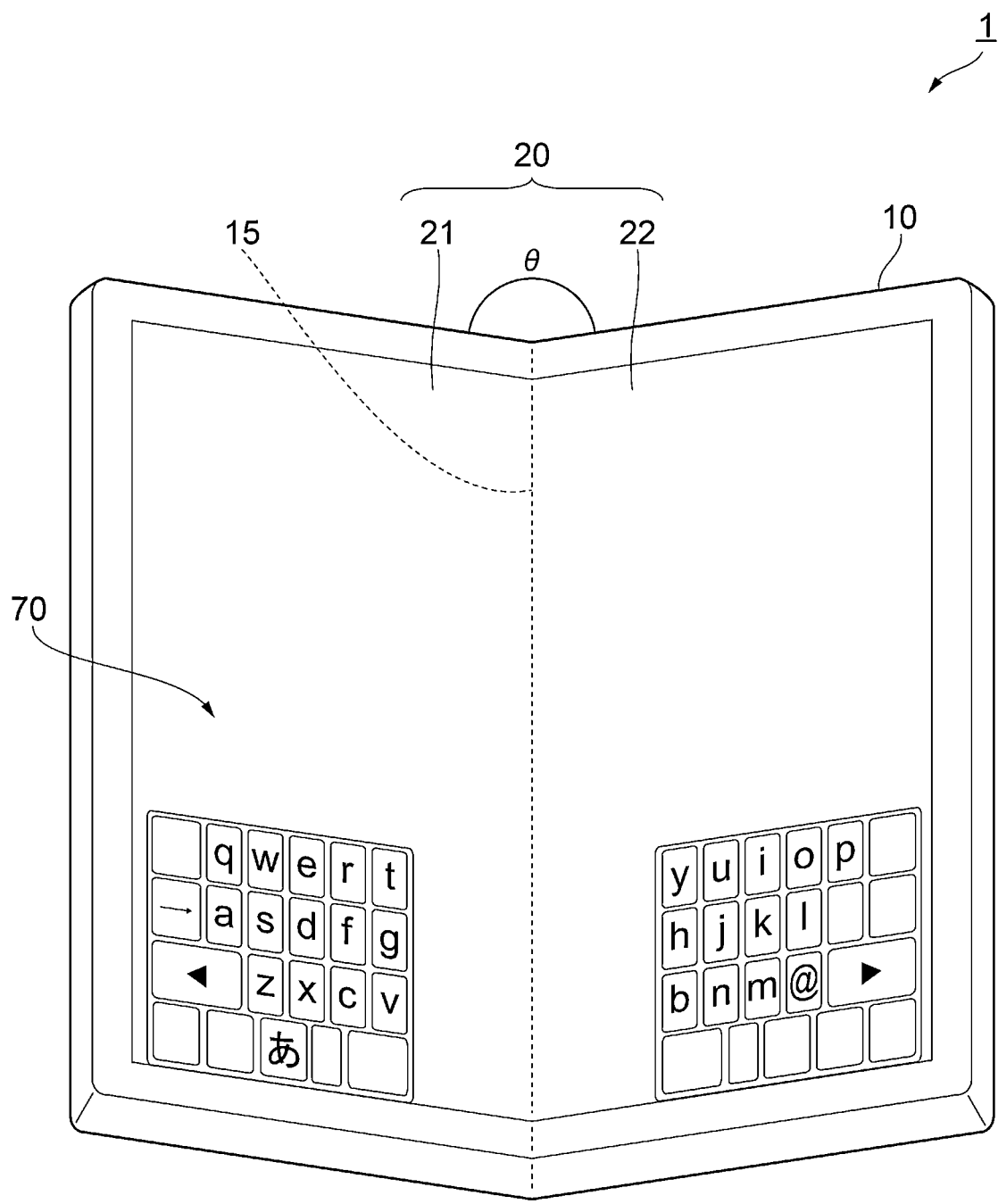
FIG. 5 is a view illustrating a receiving portion of a second mode displayed on the display region.

FIG. 5 is a view illustrating the receiving portion 70 of the second mode displayed on the display region 20. FIG. 5 illustrates a case where the folding angle θ of the display portion 10 is 120°. In FIG. 5, the vertical direction of the figure corresponds to the vertical direction of an image displayed on the display region 20 of the display portion 10.

As illustrated in FIG. 5, the receiving portion 70 of the second mode is divided into the first display region 21 and the second display region 22 of the display region 20. Further, in the receiving portion 70 of the second mode, the display area of the receiving portion 70 on the display region 20 is smaller than that of the receiving portion 70 of the first mode. Further, unlike the receiving portion 70 of the first mode, the receiving portion 70 of the second mode is displayed at a position away from the folding portion 15. In addition, in the display region 20 illustrated in FIG. 5, the receiving portion 70 is not displayed on the folding portion 15. Furthermore, in this example, the receiving portion 70 of the second mode has a key layout (so-called split keyboard) in which the physical keyboard is divided into a portion displayed in the first display region 21 and a portion displayed in the second display region 22.

Here, when the folding angle θ of the display portion 10 is equal to or larger than 90° and smaller than 180°, in many cases, the user grasps the information processing apparatus 1 with both hands, operates the first display region 21 with the thumb of one hand, and operates the second display region 22 with the thumb of the other hand. In these cases, it is difficult for the user's fingers (for example, the thumb) to reach the central portion of the display region 20 near the folding portion 15. Further, when the folding angle θ of the display portion 10 is equal to or larger than 90° and smaller than 180°, it is difficult to insert the user's fingers in the central portion of the display region 20 closer to the folding portion 15 than when the folding angle θ of the display portion 10 is 180°. Therefore, when the folding angle θ of the display portion 10 is equal to or larger than 90° and smaller than 180°, the operability of the central portion of the display region 20 near the folding portion 15 tends to be reduced.

In contrast, in the information processing apparatus 1 of the present exemplary embodiment, when the folding angle θ of the display portion 10 is equal to or larger than 90° and smaller than 180°, by displaying the receiving portion 70 in the second mode in which the display area is smaller than that of the first mode and the display position is away from the folding portion 15, the operability for the user to make an input to the receiving portion 70 is prevented from being reduced.

Referring back to FIG. 3, when the folding angle θ of the display portion 10 is larger than 0° and equal to or smaller than 90°, or larger than 180° and smaller than 360° (0°<θ≤90°, 180°<θ<360° in step 104), the controller 50 displays the receiving portion 70 on the display region 20 of the display portion 10 in a third mode different from the first mode and the second mode (step 107).

Figure 6B:
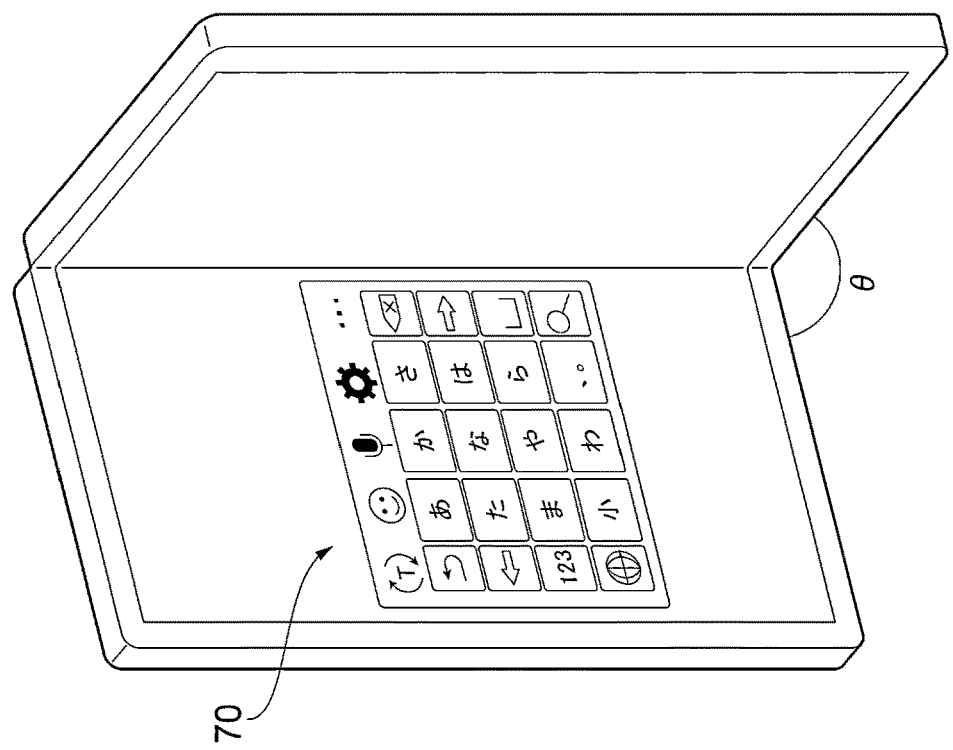
FIGS. 6A and 6B are views illustrating a receiving portion of a third mode displayed on the display region.
Figure 6A:
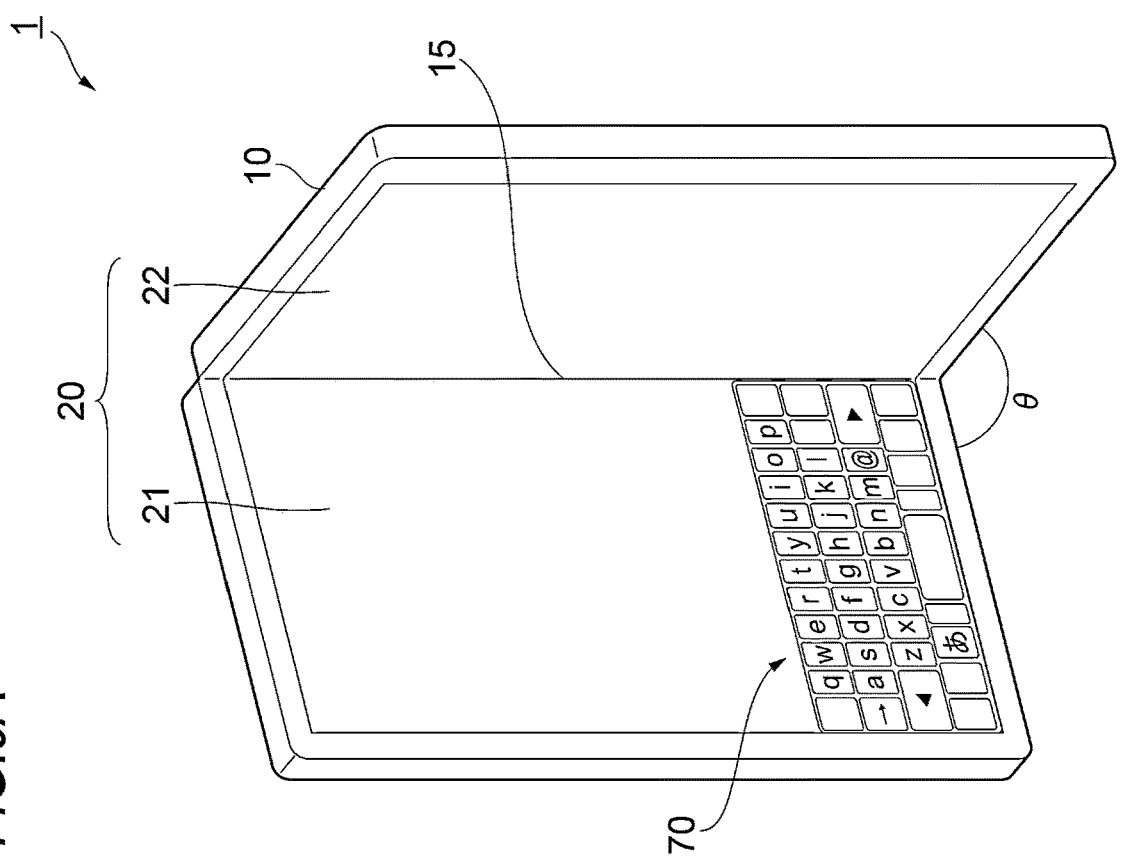

FIGS. 6A and 6B are views illustrating the receiving portion 70 of the third mode displayed on the display region 20. FIG. 6A illustrates a first example of the receiving portion 70 of the third mode, and FIG. 6B illustrates a second example of the receiving portion 70 of the third mode. FIGS. 6A and 6B illustrate a case where the folding angle θ is 90°. In FIGS. 6A and 6B, the vertical direction of the figure corresponds to the vertical direction of an image displayed on the display region 20 of the display portion 10.

As illustrated in FIGS. 6A and 6B, the receiving portion 70 of the third mode is displayed on either the first display region 21 or the second display region 22 of the display region 20 (in this example, the first display region 21). Further, in the receiving portion 70 of the third mode, the display area of the receiving portion 70 on the display region 20 is smaller than that of the receiving portion 70 of the first and second modes. Further, in this example, in the receiving portion 70 of the third mode illustrated in FIG. 6A, all alphabets are arranged in a so-called qwerty layout. Further, in the receiving portion 70 of the third mode illustrated in FIG. 6B, the alphabets are arranged in a numeric keypad layout.

Here, when the folding angle θ of the display portion 10 is larger than 0° and equal to or smaller than 90°, or larger than 180° and smaller than 360°, the user often uses the information processing apparatus 1 by mainly visually recognizing one of the first display region 21 and the second display region 22 and without visually recognizing the other. For example, in the examples illustrated in FIGS. 6A and 6B, in many cases, the first display region 21 is mainly visually recognized, and the second display region 22 is not visually recognized. Therefore, it is difficult for the user to operate a region that is difficult for the user to visually recognize (the second display region 22 in the examples illustrated in FIGS. 6A and 6B).

In contrast, in the information processing apparatus 1 of the present exemplary embodiment, when the folding angle θ of the display portion 10 is larger than 0° and equal to or smaller than 90°, or larger than 180° and smaller than 360°, by displaying the receiving portion 70 on one of the first display region 21 and the second display region 22 (the first display region 21 in the examples illustrated in FIGS. 6A and 6B), it is difficult to display the receiving portion 70 on a region that is difficult for the user to visually recognize (the second display region 22 in the examples illustrated in FIGS.

6A and 6B). As a result, the operability for the user to make an input to the receiving portion 70 is prevented from being reduced.

Here, the controller 50 may determine which of the first display region 21 and the second display region 22 on which the receiving portion 70 is displayed, for example, according to the detection result by the detector 30, the state of the image displayed on the display region 20, and the user's operation on the image displayed on the display region 20.

When the receiving portion 70 is displayed in the third mode, the controller 50 may change, according to the operation by the user, (i) the position where the receiving portion 70 is displayed on the first display region 21 or the second display region 22 and (ii) the area of a region where the receiving portion 70 is displayed on the first display region 21 or the second display region 22. In other words, in the third mode, the receiving portion 70 may be a so-called floating keyboard in which the display position and the display area on the display region 20 may be changed.

As a result, the receiving portion 70 may be displayed at a position with higher operability for the user on the first display region 21 or the second display region 22.

Referring back to FIG. 3, when it is determined that the orientation of the display portion 10 is the second orientation ("NO" in step 103), the controller 50 determines whether the folding angle θ of the display portion 10 is larger than 0° and equal to or smaller than) 180° (0°<θ≤180°, or is larger than 180° and smaller than 360° (180°<θ<360°) (step 108).

When it is determined that the folding angle θ of the display portion 10 is larger than 0° and equal to or smaller than 180° (0°<θ≤180° in step 108), the controller 50 displays the receiving portion 70 on the display region 20 of the display portion 10 in a fourth mode different from the first to third modes described above (step 109).

Figure 7:
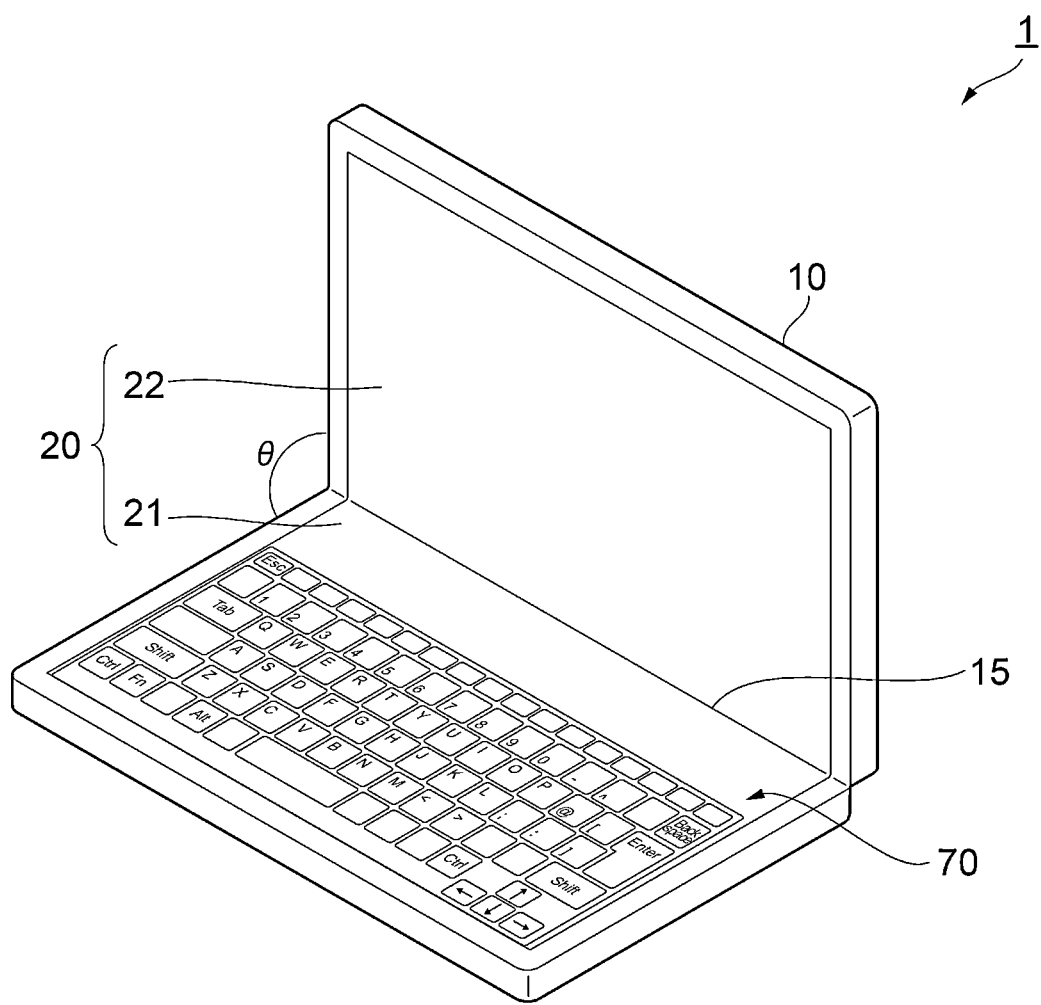
FIG. 7 is a view illustrating a receiving portion of a fourth mode displayed on the display region.

FIG. 7 is a view illustrating the receiving portion 70 of the fourth mode displayed on the display region 20. FIG. 7 illustrates a case where the folding angle θ of the display portion 10 is 90°.

As illustrated in FIG. 7, the receiving portion 70 of the fourth mode is displayed on one of the first display region 21 and the second display region 22 of the display region 20 (the second display region 22 in this example). Further, in this example, the receiving portion 70 of the fourth mode is displayed over substantially the entire surface of the second display region 22. Further, in this example, the receiving portion 70 of the fourth mode has the same key layout as the physical keyboard used in a PC.

Here, when the folding angle θ of the display portion 10 is larger than 0° and equal to or smaller than 180°, in many cases, the user operates the display region 20 with both hands while putting the information processing apparatus 1 on a table, or grasps the information processing apparatus 1 with one hand and, at the same time, operates the display region 20 with the other hand. In addition, when the folding angle θ of the display portion 10 is larger than 0° and equal to or smaller than 180°, in many cases, the user visually recognize one of the first display region 21 and the second display region 22 of the display region 20 (the first display region 21 located on the upper side in the vertical direction of the image in this example) while operating the other of the display region 20 (the second display region 22 located on the lower side in the vertical direction of the image in this example).

In the information processing apparatus 1 of the present exemplary embodiment, when the folding angle θ of the display portion 10 is larger than 0° and equal to or smaller than 180°, by displaying the receiving portion 70 in the fourth mode illustrated in FIG. 7 over substantially the entire surface of one of the first display region 21 and the second display region 22 of the display region 20 (the second display region 22 in this example) that is easy for the user to operate, the operability for the user to make an input to the receiving portion 70 is prevented from being reduced.

Referring back to FIG. 3, when it is determined that the folding angle θ of the display portion 10 is larger than 180° and smaller than 360° (180°<θ<360° in step 108), the controller 50 displays the receiving portion 70 on the display region 20 of the display portion 10 in a fifth mode different from the first to fourth modes described above (step 110).

Figure 8:
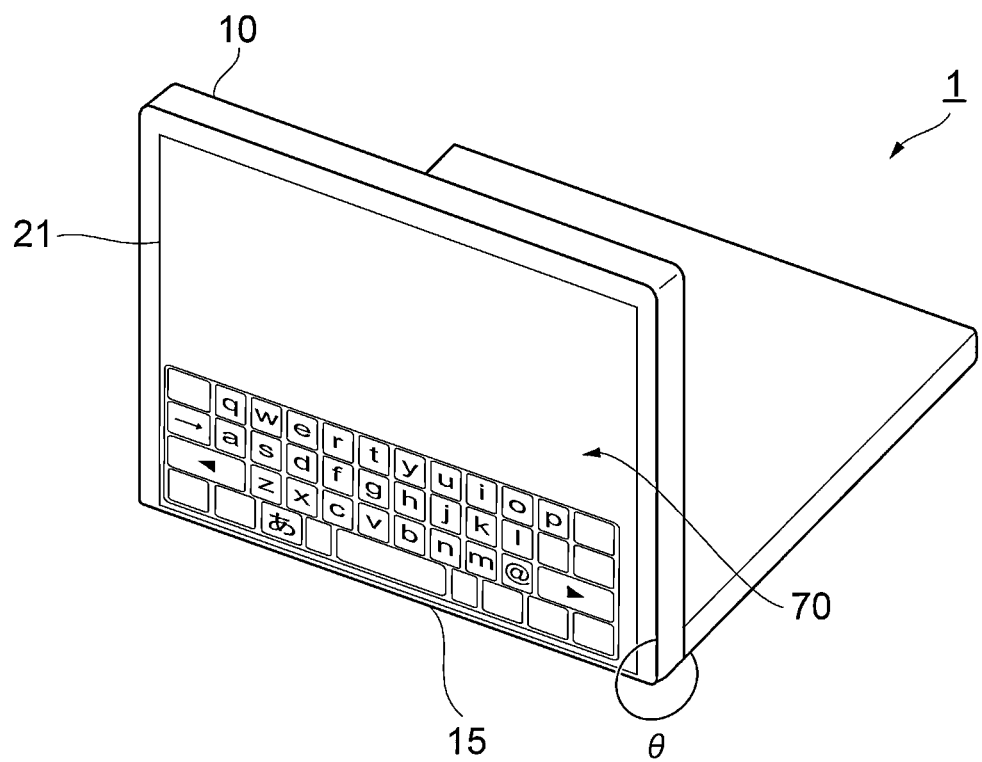
FIG. 8 is a view illustrating a receiving portion of a fifth mode displayed on the display region.

FIG. 8 is a view illustrating the receiving portion 70 of the fifth mode displayed on the display region 20. FIG. 8 illustrates a case where the folding angle θ of the display portion 10 is 270°.

As illustrated in FIG. 8, the receiving portion 70 of the fifth mode is displayed in one of the first display region 21 and the second display region 22 of the display region 20 (the first display region 21 in this example). Further, the receiving portion 70 of the fifth mode is displayed in a portion of the first display region 21 (in this example, the lower half region in the vertical direction of the image). Further, in this example, in the receiving portion 70 of the fifth mode, all the alphabets are arranged in a so-called qwerty layout.

Here, when the folding angle θ of the display portion 10 is larger than 180° and smaller than 360°, in many cases, the user operates the display region 20 with both hands while putting the information processing apparatus 1 on a table, or grasps the information processing apparatus 1 with one hand and, at the same time, operates the display region 20 with the other hand. In addition, when the folding angle θ of the display portion 10 is larger than 180° and smaller than 360°, in many cases, the user visually recognizes and operates only one of the first display region 21 and the second display region 22 of the display region 20 (in this example, the first display region 21 located on the upper side in the vertical direction of the image), but does not use the other (in this example, the second display region 22 located on the lower side in the vertical direction of the image).

In the information processing apparatus 1 of the present exemplary embodiment, when the folding angle θ of the display portion 10 is larger than 180° and smaller than 360°, by displaying the receiving portion 70 in the fifth mode illustrated in FIG. 8 on a portion of one of the first display region 21 and the second display region 22 of the display region 20 (the first display region 21 in this example), which is visually recognized and operated by the user, the operability for the user to make an input to the receiving portion 70 is prevented from being reduced. Further, by displaying the receiving portion 70 on a portion of one of the first display region 21 and the second display region 22 of the display region 20 (the first display region 21 in this example), which is visually recognized and operated by the user, another image may be displayed in a region where the receiving portion 70 is not displayed. Therefore, even when the other of the first display region 21 and the second display region 22 of the display region 20 (the second display region 22 in this example) may not be visually recognized, the convenience of the information processing apparatus 1 by the user is prevented from being reduced.

Referring back to FIG. 3, after displaying the receiving portion 70 on the display region 20 of the display portion 10 in each mode, the controller 50 determines whether an operation of inputting characters using the receiving portion 70 by the user (hereinafter, referred to as an input operation) has been completed (step 111).

When it is determined that the input operation is not completed ("NO" in step 111), the controller 50 returns to step 102 to continue the process. In this case, when the folding angle θ of the display portion 10 or the orientation of the display portion 10 is changed due to the user's operation on the information processing apparatus 1, the controller 50 determines a mode (one of the first to fifth modes) of displaying the receiving portion 70 according to the changed folding angle θ of the display portion 10 or the changed orientation of the display portion 10. In other words, the controller 50 displays the receiving portion 70 on the display portion 10, and when the folding angle θ of the display portion 10 or the orientation of the display portion 10 is changed, changes the mode of displaying the receiving portion 70 according to the changed folding angle θ of the display portion 10 and the changed orientation of the display portion 10. As a result, since the mode of displaying the receiving portion 70 may be changed to a mode suitable for the usage state of the information processing apparatus 1 by the user, the operability for the user to make an input to the receiving portion 70 is prevented from being reduced.

Meanwhile, when it is determined that the input operation is completed ("YES" in step 111), the controller 50 ends the display of the receiving portion 70 on the display region 20 and ends a series of processes.

As described above, in the information processing apparatus 1 of the present exemplary embodiment, the controller 50 displays the receiving portion 70 on the display region 20 of the display portion 10 in different modes according to the folding angle θ of the display portion 10 and the orientation of the display portion 10.

As a result, the operability for the user to make an input to the receiving portion 70 is prevented from being reduced, as compared with a case where the receiving portion 70 is displayed in the same mode irrespective of the folding angle θ of the display portion 10 and the orientation of the display portion 10.

Further, in the information processing apparatus 1 of the present exemplary embodiment, as described above, when the orientation of the display portion 10 is the first orientation and the folding angle θ of the display portion 10 is equal to or smaller than 180°, as the folding angle θ of the display portion 10 becomes smaller, the display area that displays the receiving portion 70 on the display portion 10 becomes smaller.

Here, when the folding angle θ of the display portion 10 is equal to or smaller than 180°, as the folding angle θ becomes smaller, it becomes more difficult to insert the user's fingers in the central portion of the display region 20 near the folding portion 15. Therefore, as the folding angle θ becomes smaller, a region on the display region 20 that is easy for the user to operate becomes smaller.

In contrast, as the folding angle θ of the display portion 10 becomes smaller, the display area that displays the receiving portion 70 on the display portion 10 becomes smaller, so that it is easier to display the receiving portion 70 in a region on the display region 20 that is easy for the user to operate. As a result, since it becomes difficult for the receiving portion 70 to form a portion that is difficult for the user to operate, the operability for the user to make an input to the receiving portion 70 is prevented from being reduced.

Further, in the information processing apparatus 1 of the present exemplary embodiment, as described above, when the orientation of the display portion 10 is the first orientation and the folding angle of the display portion 10 is larger than 90° and equal to or smaller than 180°, as the folding angle θ of the display portion 10 becomes smaller, the receiving portion 70 is displayed on the display portion 10 at a position farther from the folding portion 15.

Here, when the folding angle θ of the display portion 10 is equal to or smaller than 180°, as the folding angle θ becomes smaller, it becomes more difficult to insert the user's fingers in the central portion of the display region 20 near the folding portion 15. Therefore, as the folding angle θ becomes smaller, it becomes more difficult for the user to operate the receiving portion 70 in a region near the folding portion 15.

In contrast, as the folding angle θ of the display portion 10 becomes smaller, the receiving portion 70 is displayed at a position farther from the folding portion 15, so that the receiving portion 70 is prevented from being displayed at a position on the display region 20 that is difficult for the user to operate. As a result, the operability for the user to make an input to the receiving portion 70 is prevented from being reduced.

Furthermore, in the information processing apparatus 1 of the present exemplary embodiment, as described above, it is determined whether the folding angle θ of the display portion 10 belongs to a predetermined range, and based on the result of determination, a mode of displaying the receiving portion 70 is determined from the first to fifth modes, without being limited thereto. The controller 50 may continuously change the mode of displaying the receiving portion 70 according to the folding angle θ of the display portion 10. Specifically, the controller 50 may continuously change at least one of (i) the display position of the receiving portion 70 on the display region 20 of the display portion 10, (ii) the display area of the receiving portion 70 on the display region 20 of the display portion 10, or (iii) the elements constituting the receiving portion 70, according to the folding angle θ of the display portion 10. As a result, the receiving portion 70 may be displayed in a more suitable mode for the display region 20 of the display portion 10 according to the folding angle of the display portion 10.

In FIG. 3 and the above-described exemplary embodiment, in step 101, as a predetermined operation for the display portion 10, it is determined whether a predetermined operation (specifically, the input start operation) has been performed for an image displayed on the display region 20 of the display portion 10. It is noted that the present disclosure is not limited thereto.

The controller 50 may determine in step 101 whether an operation for changing the folding angle θ of the display portion 10 has been performed as the predetermined operation for the display portion 10. That is, when it is determined that the operation of changing the folding angle θ of the display portion 10 is performed, the controller 50 may display the receiving portion 70 on the display region 20 of the display portion 10 according to the folding angle θ of the display portion 10.

Figure 9A:
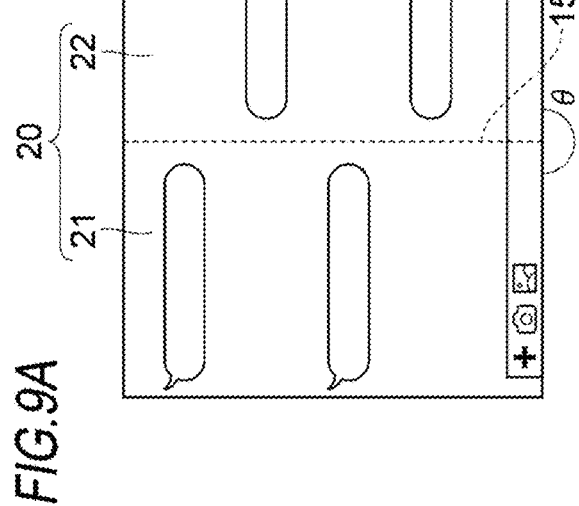
FIGS. 9A to 9C are views illustrating examples of an image displayed on the display region.
Figure 9C:
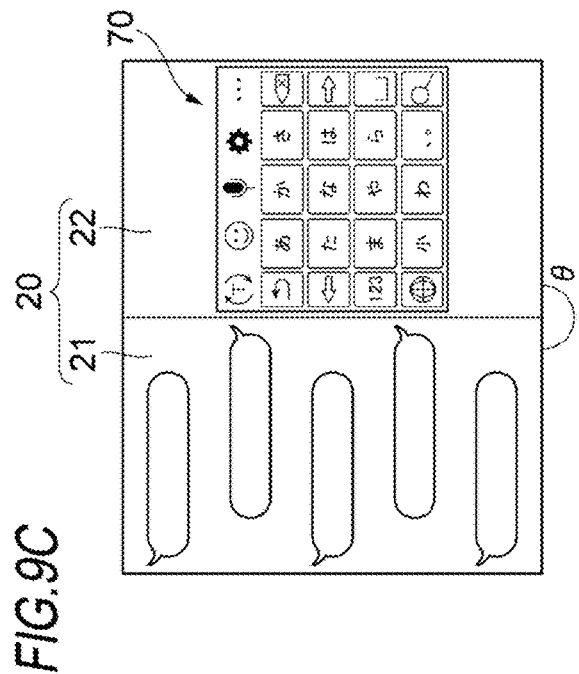
Figure 9B:
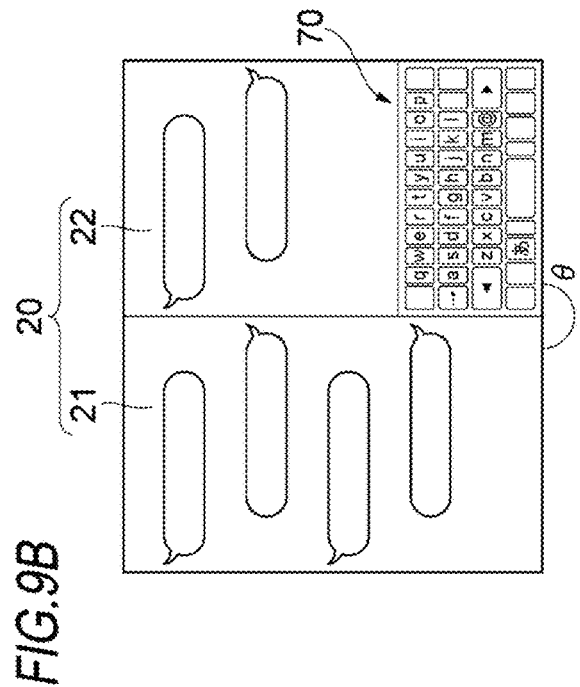

FIGS. 9A to 9C are views illustrating an example of images displayed on the display region 20. FIGS. 9A to 9C illustrate a mode of displaying the receiving portion 70 on the display region 20 when an operation of changing the folding angle θ of the display portion 10 is performed. FIG. 9A illustrates an image displayed before the operation of changing the folding angle θ of the display portion 10 (see FIGS. 1A to 1D) is performed (for example, when the folding angle θ is 180°). FIGS. 9B and 9C illustrate an image displayed after the operation of changing the folding angle θ from the state illustrated in FIG. 9A is performed (for example, when the folding angle θ is changed from 180° to 120°).

The user who uses the information processing apparatus 1 may change the folding angle θ of the display portion 10 between (i) a case when simply visually recognizing an image displayed on the display region 20 of the display portion 10 and (ii) a case when performing an input operation of characters using the receiving portion 70 displayed on the display region 20.

In the present exemplary embodiment, by displaying the receiving portion 70 when the operation of changing the folding angle θ of the display portion 10 is performed, it is possible to display the receiving portion 70 on the display region 20, for example, before the input start operation for an image displayed on the display region 20 is performed. As a result, since it is possible to more quickly display the receiving portion 70 on the display region 20 than when the receiving portion 70 is displayed after the input start operation for the image displayed on the display region 20 is performed, the operability for the user to make an input to the receiving portion 70 is further prevented from being reduced.

In the above-described exemplary embodiment, the receiving portion 70 is displayed on the display region 20 according to the folding angle θ of the display portion 10 irrespective of the contents of the image displayed in the display region 20. For example, in FIG. 5, when the folding angle θ of the display portion 10 is 120°, the receiving portion 70 is displayed in the second mode in which the receiving portion 70 is divided into the first display region 21 and the second display region 22 irrespective of the contents of the image displayed on the display region 20.

Alternatively, the mode in which the receiving portion 70 is displayed on the display region 20 of the display portion 10 may be different according to the contents of an image displayed on the display region 20 of the display portion 10. Here, the contents of the image displayed on the display region 20 may include the type of application that displays the image, the nature of the image (for example, whether the image has higher perspicuity in the vertical or horizontal direction), a method of displaying characters included in the image (for example, vertical writing or horizontal writing), and an aspect ratio of the image.

Specifically, in FIG. 9A, a message screen of an SNS application is displayed on the display region 20. On the message screen of such an SNS application, plural messages are arranged in order in the vertical direction of the display region 20, so that the time series of messages, the sender of the message, and the like may be easily understood. In other words, in FIG. 9A, an image having higher perspicuity in the vertical direction is displayed on the display region 20.

In such a case, when a predetermined operation (for example, an input start operation or an operation of folding the display portion 10) is performed on the display portion 10 and the receiving portion 70 is displayed in the second mode illustrated in FIG. 5, it becomes difficult to display an image that maintains the perspicuity in the vertical direction. In this case, since it becomes difficult to grasp the contents of the image displayed on the display region 20, the convenience of the information processing apparatus 1 may be reduced.

In contrast, for example, when an image having higher perspicuity in the vertical direction is displayed on the display region 20, by displaying the receiving portion 70 on one of the first display region 21 and the second display region 22, it is possible to maintain the perspicuity in the vertical direction of the image displayed on the display region 20.

Specifically, as illustrated in FIG. 9B, the controller 50 displays the receiving portion 70 on the second display region 22 in a state where an image that maintains perspicuity in the vertical direction is displayed on the first display region 21. Alternatively, as illustrated in FIG. 9C, the controller 50 displays the receiving portion 70 on the second display region 22 in a state where an image that maintains perspicuity in the vertical direction is displayed on a portion of the first display region 21 and the second display region 22.

As a result, since it is possible to display the receiving portion 70 on the display region 20 in a state where the image that maintains the perspicuity in the vertical direction is displayed, the convenience of the information processing apparatus 1 is prevented from being reduced.

Further, in the above-described exemplary embodiment, after the receiving portion 70 is displayed on the display region 20 of the display portion 10, when the folding angle θ of the display portion 10 or the orientation of the display portion 10 is changed, the mode of displaying the receiving portion 70 is changed according to the changed folding angle θ or orientation of the display portion 10. It is noted that the present disclosure is not limited thereto.

For example, in a case where it is not preferable to change the mode of displaying the receiving portion 70 according to the contents of the image displayed on the display region 20 of the display portion 10, even when the folding angle θ of the display portion 10 or the orientation of the display portion 10 is changed, the mode of displaying the receiving portion 70 may be maintained without being changed. As a result, the convenience of the receiving portion 70 by the user is prevented from being reduced, as compared with a case where the mode of displaying the receiving portion 70 is changed according to the changed folding angle θ or orientation of the display portion 10 irrespective of the contents of the image displayed on the display region 20.

Examples of the case where it is not preferable to change the mode of displaying the receiving portion 70 include (i) a case where it is desired to maintain the display of the receiving portion 70 while inputting a sentence using the receiving portion 70 and (ii) a case where images other the receiving portion 70 have perspicuity in the vertical or horizontal direction and it is not desired to lose the perspicuity of the images.

Furthermore, in the above-described exemplary embodiment, the controller 50 determines the mode of displaying the receiving portion 70 according to both the folding angle θ of the display portion 10 and the orientation of the display portion 10. Alternatively, for example, the controller 50 may determine the mode of displaying the receiving portion 70 according to only the folding angle θ of the display portion 10 irrespective of the orientation of the display portion 10.

Description of Program

Here, the process performed by the controller 50 of the present exemplary embodiment described above is prepared as, for example, a program such as software. Then, the process is implemented by the cooperation of software and hardware resources. The program that implements the present exemplary embodiment may be provided not only by communication unit but also by storing the program in a recording medium such as a CD-ROM.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display control device comprising:
   a processor configured to:
   display a receiving portion configured to receive input by a user, on a foldable display portion in different modes according to a folding angle of the display portion, wherein
   when the folding angle is changed after the processor displays the receiving portion on the display portion and contents of an image displayed on the display portion satisfy a predetermined condition, the processor does not change a mode in which the receiving portion is displayed.

2. The display control device according to claim 1, wherein
   the processor is configured to, when the folding angle is changed after the processor displays the receiving portion on the display portion and the contents of the image displayed on the display portion do not satisfy the predetermined condition, change the mode of displaying the receiving portion according to the folding angle.

3. A display device comprising:
   a foldable display portion; and
   a display controller configured to display a receiving portion, configured to receive input by a user, on the display portion in different modes according to a folding angle of the display portion, wherein
   when the folding angle is changed after the display controller displays the receiving portion on the display portion and contents of an image displayed on the display portion satisfy a predetermined condition, a mode in which the receiving portion is displayed is not changed.

4. The display device according to claim 3, wherein
   the display controller is configured to, when the folding angle is changed after the display controller displays the receiving portion on the display portion and the contents of the image displayed on the display portion do not satisfy the predetermined condition, change the mode of displaying the receiving portion according to the folding angle.

5. A non-transitory computer readable medium storing a program that causes a computer to execute display control processing, the display control processing comprising:
   displaying a receiving portion, configured to receive input by a user, on a foldable display portion in different modes according to a folding angle of the display portion, wherein
   when the folding angle is changed after the receiving portion is displayed on the display portion and contents of an image displayed on the display portion satisfy a predetermined condition, not changing a mode in which the receiving portion is displayed.

6. The non-transitory computer readable medium according to claim 5, wherein
   when the folding angle is changed after displaying the receiving portion on the display portion and the contents of the image displayed on the display portion do not satisfy the predetermined condition, changing the mode of displaying the receiving portion according to the folding angle.

* * * * *